United States Patent [19]

Rau et al.

[11] Patent Number: 4,532,491

[45] Date of Patent: Jul. 30, 1985

[54] LIQUID-LEVEL TRANSMITTER WITH BELL JAR HOUSING FOR GASOLINE TANKS

[75] Inventors: Karl Rau, Mühlheim; Martin Haub, Steinbach, both of Fed. Rep. of Germany

[73] Assignee: VDO Adolf Schindling AG, Frankfurt am Main, Fed. Rep. of Germany

[21] Appl. No.: 424,718

[22] Filed: Sep. 27, 1982

[30] Foreign Application Priority Data

Nov. 21, 1981 [DE] Fed. Rep. of Germany ....... 3146213

[51] Int. Cl.³ .................... H01L 10/14; G01F 23/10
[52] U.S. Cl. ...................... 338/33; 73/308; 73/313; 73/317
[58] Field of Search .................... 338/33; 73/308, 317, 73/313; 340/625

[56] References Cited

U.S. PATENT DOCUMENTS

| 1,185,144 | 5/1916 | Stukel | 73/313 |
| 2,266,298 | 12/1941 | Bacon | 338/33 |
| 3,200,646 | 8/1965 | Donko et al. | 73/317 |
| 3,482,200 | 12/1969 | Hamilton | 73/313 |
| 4,114,130 | 9/1978 | Sutton et al. | 338/33 |
| 4,184,370 | 1/1980 | Schlick et al. | 338/33 |
| 4,229,973 | 10/1980 | Hava | 73/317 |
| 4,337,657 | 7/1982 | Morris | 73/313 |

FOREIGN PATENT DOCUMENTS

| 2720101 | 5/1977 | Fed. Rep. of Germany | 338/33 |
| 55-72822 | 6/1980 | Japan | 73/317 |

Primary Examiner—Roy N. Envall, Jr.
Assistant Examiner—C. N. Sears
Attorney, Agent, or Firm—Martin A. Farber

[57] ABSTRACT

In a liquid-level transmitter having a swingable support lever (3) which bears a float (7) and a variable electrical resistor (9) actuated thereby, the variable resistor (9) is surrounded by a bell-shaped structural part (1) which is open towards the bottom but otherwise closed. In this way, as in the case of a diving bell, no liquid can enter into the bell-shaped structural part (1) when the level of the liquid rises above the height of the liquid-level transmitter, so that parts of the variable resistor are protected in simple fashion from corrosion due to contact with the liquid to be measured.

20 Claims, 2 Drawing Figures

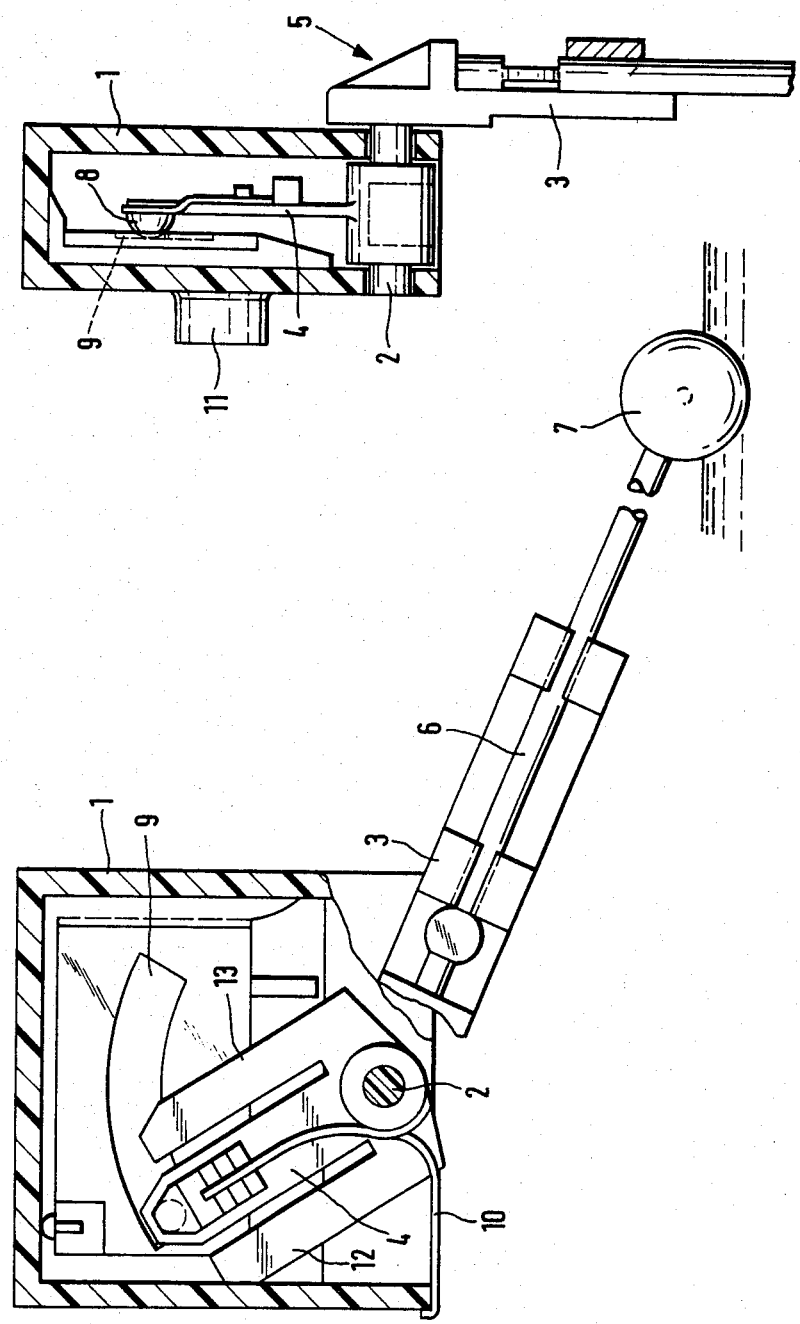

LIQUID-LEVEL TRANSMITTER WITH BELL JAR HOUSING FOR GASOLINE TANKS

The present invention relates to a liquid-level transmitter, particularly for automobile fuel tanks, comprising a swingably supported lever which bears a float and is operatively connected to a wiper contact which is movable along an electrical resistor upon the swinging of the lever.

Such liquid-level transmitters are frequently provided in the fuel tanks of modern automotive vehicles in order to produce a measurement value for the indication of the amount of fuel in the tank. They are therefore generally known.

Modern carburetor fuels contain an increasing amount of methyl alcohol as compared with what was previously the case. It has been found that parts in which current flows corrode particularly easily due to this methyl alcohol. Therefore it is necessary to prevent at least the electric resistor and the wiper of the liquid-level transmitter from coming into contact with the gasoline in the tank. This could, of course, be done by arranging the liquid-level transmitter in a liquid-tight housing. To be sure, the level bearing the float would have to be extended out of this housing. Aside from the fact that such a liquid-proof housing would be relatively expensive to manufacture, the required sealing of the outward-extending lever would lead to friction which might prevent an accurate indication of the level.

The object of the present invention is to develop a liquid-level transmitter of the aforementioned type which is protected in simple fashion from contact with the fluid to be measured and which operates with as little friction as possible so as to obtain a high precision of measurement.

This object is achieved in accordance with the invention in the manner that at least the wiper (8) and the electric resistor (9) are arranged in a bell-shaped structural part (1) which is open towards the bottom but otherwise sealed off.

The liquid-level transmitter of the invention operates in accordance with the "diving bell" principle. Even if the level of the liquid to be measured rises to above the wiper and the electric resistor, these parts do not come into contact with the liquid since an air bubble is formed in the bell-shaped structural part and prevents the penetration of liquid. By this shape assurance is had that the current-conducting parts of the liquid-level transmitter cannot be attacked by electrochemical corrosion. Since the bell-shaped structural part is open towards the bottom, the lever which bears the float can extend entirely freely out of the structural part. Accordingly, no seals are necessary which would increase the cost of manufacture of the liquid-level transmitter and lead to friction between the seal and the outward-extended lever. Such friction would reduce the precision of measurement of the liquid-level transmitter and lead to friction between the seal and the outward-extended lever. Such friction would reduce the precision of measurement of the liquid-level transmitter.

Particularly good protection from the liquid to be measured is obtained if the bell-shaped structural part (1) extends to below the point of mounting of the lever (5). In that case the shaft of the lever and its mounting are also protected from contact with the liquid to be measured so that the shaft can, for instance, also be made of metal.

In accordance with another advantageous embodiment, the wiper (8) comprises an arm (4) of plastic which extends from the pivot axle of the lever (5) to the resistor (9) and a wiper contact (8) which is fastened in the vicinity of the free end of the arm. The wiper contact can then be connected via a flexible insulated wire with one in the upper part of the bell-shaped structural part. With such an embodiment assurance is had that, even upon sloshing movements of the fuel in the tank or in the event of fuel splattering into the bell-shaped structural part, any possible corrosion of the electrically conductive parts is reduced to a minimum.

The swinging motion of the lever can be limited towards both sides in particularly simple fashion by providing two stops (12, 13) in the shape of a yoke on both sides of the arm bearing the wiper contact (8). Furthermore, it has been found advisable to make the stops (12, 13) displaceable relative to the wiper contact (8). In such case, a particularly simple possibility of calibration is obtained. Instead of this embodiment, or else in combination with it, the bell-shaped structural part can advantageously be provided with a pin (11) which extends transversely to the plane of the electric resistor (9) and serves for swingable mounting in a flange which can be fastened to the tank so that calibration can be effected also by the swinging of the structural part. Another possibility, finally, would be to arrange the electric resistor in displaceable position within the structural part.

In one embodiment which is preferred for reasons of consideration of manufacture, the lever, the arm (4) bearing the wiper contact (8) and—if present—the stops (12, 13) form a single unit of plastic.

The invention permits of numerous embodiments. One embodiment of the invention which will be described below is shown diagrammatically in the drawing, in which:

FIG. 1 is a front view, partially in section, of a liquid-level transmitter according to the invention; and FIG. 2 is a side view, partially in section, of the liquid-level transmitter of FIG. 1.

The liquid-level transmitter comprises a bell-shaped structural part 1 which is completely closed on its top and sides but open on its bottom. Within the lower part of the bell-shaped structural part 1 a shaft 2 is turnably mounted in two side walls, the shaft consisting of plastic and passing on its periphery into an arm 4. The lever 3 is formed on one end of the shaft 2 outside the structural part 1, and a bar 6 bearing a float 7 on the end thereof facing away from the lever 3 is engaged in the lever. The shaft 2, the lever 3 and the arm 4 form a single unit of a thermoplastic resin.

The arm 4 bears a wiper contact 8 of electrically conductive material at its free end, said contact resting with spring force against an electric resistor 9. This resistor is preferably a thick-layer resistor. The wiper contact 8 is connected to a source of voltage by an electric cable 10.

In order to be able to calibrate the liquid-level transmitter, a pin 11 is formed, transverse to the plane of the resistor 9, on the outside of the side wall of the bell-shaped structural part 1 which contains the resistor 9 within it. By means of this pin 11, the bell-shaped structural part can be placed into an opening in a mount (not shown), such as, for instance, in a flange. Due to the pin 11 it is possible to swing the bell-shaped structural part 1 so that the zero position of the liquid-level transmitter can be changed.

In order to limit the maximum possible swing of the arm 4 in both directions, two stops 12 and 13 in the shape of a yoke which extend parallel to the arm 4 are developed on the shaft 2 and the arm 4 extends between them. These stops 12 and 13 are so dimensioned that in one end position the stop 12 comes to rest on the inside against one side wall of the bell-shaped structural part 1 while in the other end position the stop 13 comes to rest against the opposite side wall of the bell-shaped structural part 1.

The operation of the liquid-level transmitter of the invention is simple. In the position shown in the drawing, electrical current can flow through the cable 10 via the wiper 8 into the resistor 9 and from there, via a connecting cable (not shown) on the left side of the resistor 9 as seen in FIG. 1, to an indicating instrument. If the level of the liquid drops, the float 7 also descends. As a result, the lever 3 and the arm 4 swing in clockwise direction. The wiper contact 8, due to the swinging movement, travels on the resistor 9 towards the right as seen in the drawing, as a result of which the resistance of the electrical circuit increases, which leads to a change in the deflection of the pointer of the indicating instrument.

We claim:

1. In combination in a fuel tank a liquid-level transmitter comprising a pivotally supported lever which carries a float and is operatively connected to a contact of a wiper which is movable along an electrical resistor upon pivoting of the lever, the improvement comprising
   a housing formed as a bell-shaped structural part having an opening located at the bottom and being sealed off at all other portions thereof,
   the wiper and the electrical resistor being disposed in said bell-shaped structural part, and wherein
   all portions of said resistor are supported within said housing at a sufficient distance above said opening so as to inhibit wetting of the resistor by the liquid during a raising of the fuel liquid level in the fuel tank, and wherein
   said wiper is supported at a mounting on said housing, and extends from said mounting away from said opening for contacting said resistor.

2. The transmitter as set forth in claim 1, wherein said lever is mounted at a bearing on said bell-shaped structural part,
   said bell-shaped structural part extends to below said bearing of the lever.

3. The transmitter as set forth in claim 1, wherein said lever is formed with a pivot axle,
   said wiper comprises an arm made of plastic which extends from the pivot axle of the lever to the resistor,
   the wiper contact is fastened in a vicinity of a free end of said arm.

4. The transmitter as set forth in claim 3, further comprising
   two abutment stops formed in the shape of a yoke on both sides of the arm, the latter carrying the wiper contact.

5. The transmitter as set forth in claim 4, wherein said stops are displaceable relative to the wiper contact.

6. The transmitter as set forth in claim 3, wherein said lever and said arm form a one-piece unit made of plastic.

7. The transmitter as set forth in claim 4, wherein said lever, said stops and said arm form a one-piece unit made of plastic.

8. The transmitter as set forth in claim 4, wherein the bell-shaped structural part is provided with a pin which extends transversely to a plane defined by the electric resistor,
   said pin constitutes means for pivotally mounting said bell-shaped structural part to a tank.

9. The transmitter as set forth in claim 1, wherein the electric resistor is mounted displaceably within said bell-shaped structural part.

10. The transmitter as set forth in claim 1, wherein said liquid-level transmitter is mountable in said fuel tank of a vehicle for measuring the level of the fuel therein.

11. The transmitter as set forth in claim 4, wherein said bell-shaped structural part has two side walls, and
    said stops are so arranged with respect to said arm that upon pivoting of said lever in one direction one of said stops abuts against one of said side walls and upon pivoting of said lever in an opposite direction the other of said stops abuts against another of said side walls.

12. The transmitter as set forth in claim 4, wherein said two stops and said arm are made of one-piece.

13. The transmitter as set forth in claim 12, wherein said one-piece is made of plastic.

14. The transmitter as set forth in claim 2, wherein said lever is formed with a pivot axle,
    said bell-shaped structural part has spaced apart walls each defining an opening in which said pivot axle is pivotally mounted, and
    said bearing is constituted exclusively by said pivot axle and said opening.

15. The transmitter as set forth in claim 14, wherein said wiper and said electric resistor are arranged above said bearing.

16. In combination in a fuel tank a liquid-level transmitter comprising a pivotally supported lever which carries a float and is operatively connected to a contact of a wiper which is movable along an electrical resistor upon pivoting of the lever, the improvement comprising
    a housing formed as a bell-shaped structural part having an opening located at the bottom and being sealed off at all other portions thereof,
    the wiper and the electrical resistor being disposed in said bell-shaped structural part, and wherein
    all portions of said resistor are supported within said housing at a sufficient distance above said opening so as to inhibit wetting of the resistor by the liquid during a raising of the fuel liquid level in the fuel tank, and wherein
    said wiper is supported at a mounting on said housing, and extends from said mounting away from said opening for contacting said resistor,
    said lever is mounted at a bearing on said bell-shaped structural part,
    said bell-shaped structural part extends to below said bearing of the lever,
    said lever is formed with a pivot axle,
    said wiper comprises an arm made of plastic which extends from the pivot axle of the lever to the resistor, and
    the wiper contact is fastened in a vicinity of a free end of said arm.

17. The transmitter as set forth in claim 1, wherein said fuel tank is adapted to contain methanol and gasoline.

18. The transmitter as set forth in claim 16, wherein said fuel tank is adapted to contain methanol and gasoline.

19. The transmitter as set forth in claim 1, wherein said open is centrally free and spaced above the float and a bottom of the fuel tank.

20. The transmitter as set forth in claim 16, wherein said open is centrally free and spaced above the float and a bottom of the fuel tank.

* * * * *